(12) United States Patent
Arthur et al.

(10) Patent No.: US 6,517,138 B1
(45) Date of Patent: Feb. 11, 2003

(54) RECESSED AIR CONDITIONING CONTROLS FOR A UTILITY VEHICLE

(75) Inventors: John Raymond Arthur, Grovetown, GA (US); Russell William Strong, Craftsbury Common, VT (US); Daniel Olson, Winnipeg (CA)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/945,538

(22) Filed: Aug. 29, 2001

(51) Int. Cl.[7] ............................................. B62D 25/14
(52) U.S. Cl. ....................... 296/70; 296/37.1; 180/90; 280/775
(58) Field of Search .................. 296/70, 37.1, 37.8, 296/68.1; 180/90, 89.13; 280/775; 310/67 R

(56) References Cited

U.S. PATENT DOCUMENTS

| | | | | |
|---|---|---|---|---|
| 3,583,519 A | * | 6/1971 | Meyer et al. ................. | 180/90 |
| 4,126,202 A | * | 11/1978 | Hern .......................... | 180/90 |
| 4,344,356 A | | 8/1982 | Casterton et al. | |
| 4,352,401 A | * | 10/1982 | Vitaloni ....................... | 180/90 |
| 4,403,818 A | * | 9/1983 | Kleinbohl .................... | 296/70 |
| 4,447,860 A | * | 5/1984 | Stone et al. ................. | 296/70 |
| 4,503,504 A | * | 3/1985 | Suzumura et al. .......... | 280/775 |
| 4,561,323 A | * | 12/1985 | Stromberg ................... | 280/775 |
| 4,600,236 A | | 7/1986 | Weiss et al. | |
| 4,664,220 A | * | 5/1987 | Ruhter et al. ............... | 280/775 |
| 4,799,848 A | * | 1/1989 | Buckley ................... | 180/89.13 |
| 5,224,751 A | * | 7/1993 | Hirashima et al. ............ | 296/70 |
| D362,098 S | * | 9/1995 | Heiler ......................... | 296/70 |
| 5,678,649 A | * | 10/1997 | Minoura et al. ........... | 180/68.1 |
| 5,825,338 A | * | 10/1998 | Salmon et al. ............. | 310/67 R |
| 5,860,856 A | | 1/1999 | Teich et al. | |
| 5,890,756 A | * | 4/1999 | Pranger et al. ............. | 296/37.1 |
| 6,061,617 A | * | 5/2000 | Berger et al. ................ | 700/18 |
| 6,123,377 A | * | 9/2000 | Lecher et al. .............. | 296/37.8 |
| 6,322,122 B2 | * | 11/2001 | Burns et al. ................. | 296/70 |
| 6,371,551 B1 | * | 4/2002 | Hedderly .................... | 296/70 |
| 2002/0017798 A1 | * | 2/2002 | Shikata et al. ............... | 296/70 |

* cited by examiner

*Primary Examiner*—Kiran Patel
(74) *Attorney, Agent, or Firm*—Polit & Associates, LLC

(57) ABSTRACT

A steering wheel console is provided that includes a sidewall with a recessed area. The recessed area carries air conditioning controls in a fashion that the controls do not extend outwardly of the recessed area. By locating the controls within the recessed area, the controls are substantially protected from being disturbed by interference from an operator's leg during entry and exit to/from the utility vehicle and during operation of the utility vehicle.

5 Claims, 4 Drawing Sheets

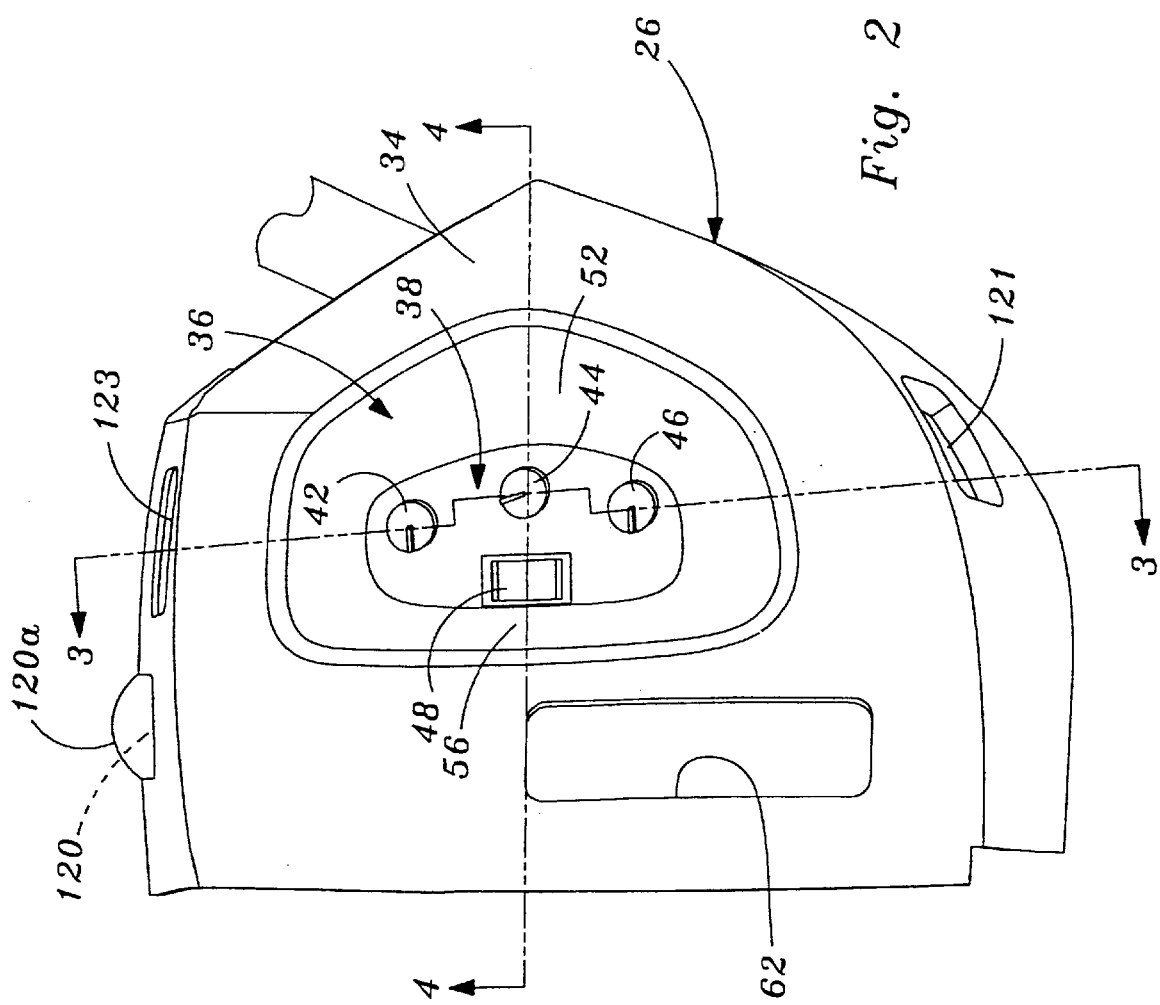

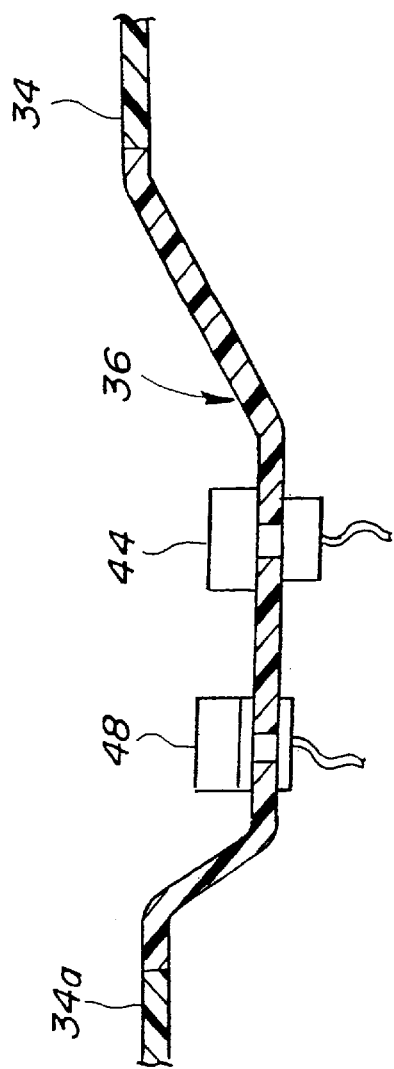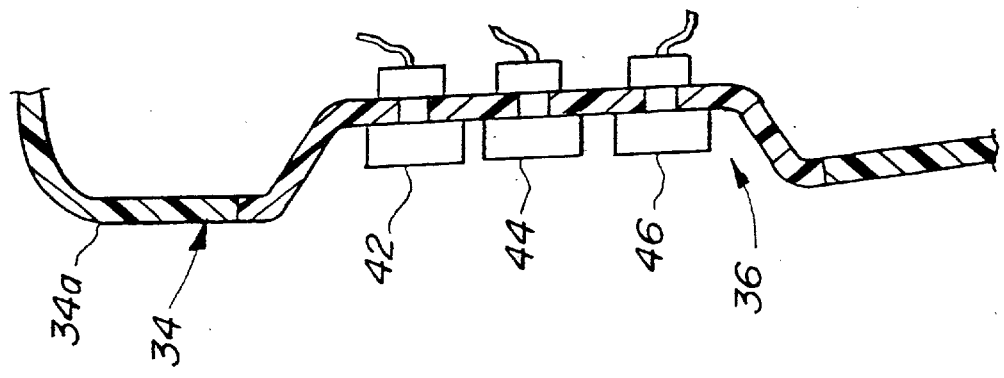

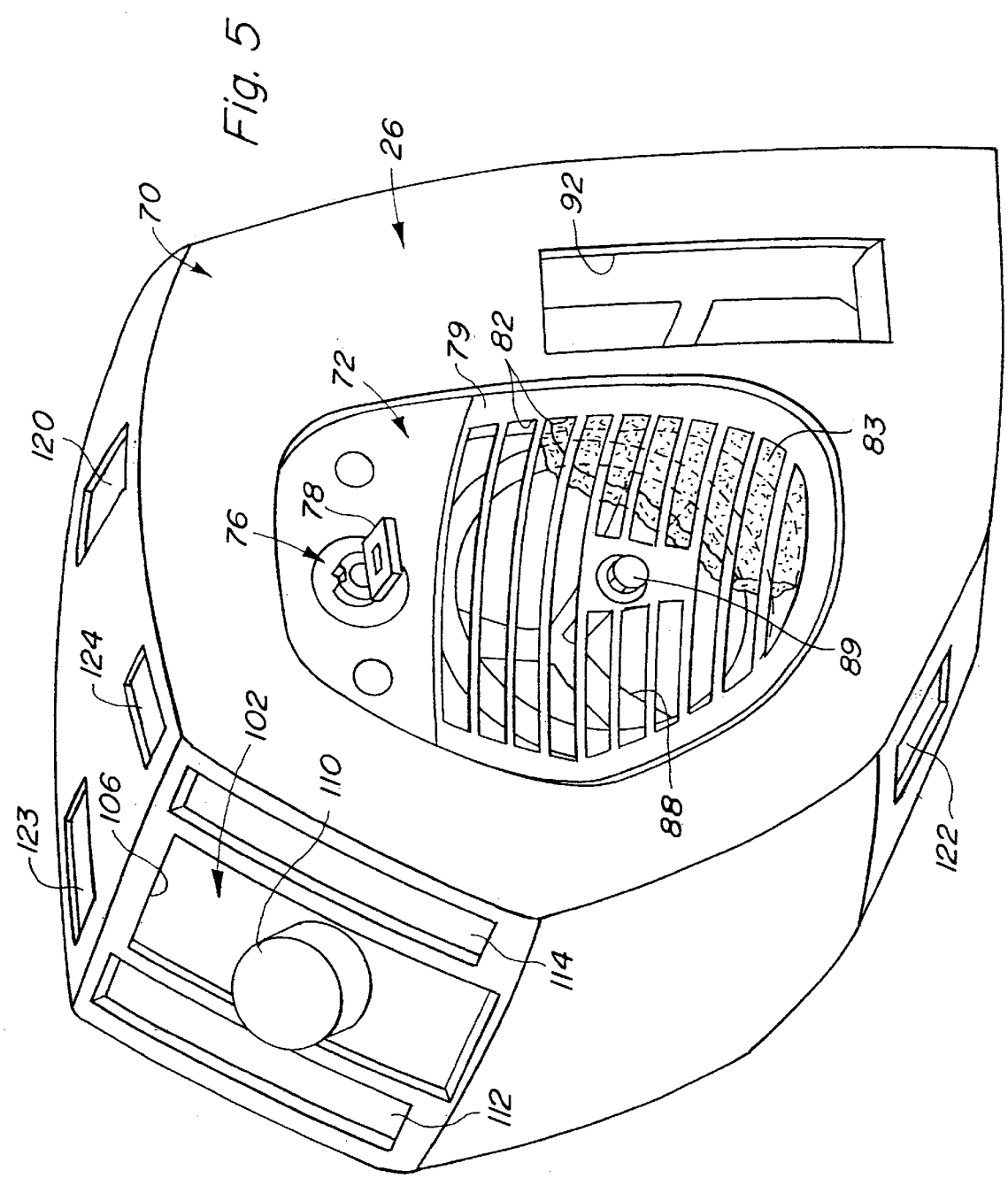

US 6,517,138 B1

RECESSED AIR CONDITIONING CONTROLS FOR A UTILITY VEHICLE

TECHNICAL FIELD OF THE INVENTION

The invention relates to utility vehicles, particularly to control panel layouts for utility vehicles.

BACKGROUND OF THE INVENTION

A utility vehicle, such as disclosed in U.S. Pat. Nos. 5,064,339 and 5,967,737 can be equipped with front-end loader buckets, and rear-mounted backhoe attachments. Tractors can also be equipped with other tools such as snowblowers, lawnmower decks, tillers, etc. Generally, the more functions a utility vehicle is equipped for, the more controls are required. In a limited-size operator station or cab, controls must be carefully arranged to provide for convenient, effective and efficient operation of the vehicle by the operator.

Because of the relatively confined area of the operator station, dashboard areas or control panel areas, accessible to the operator, become scarce. Controls which are located in and around the cab footwells can be inadvertently changed by contact with the operator's leg.

The present inventors have recognized that it would be desirable to provide additional control panel areas, accessible to an operator, while being relatively protected from inadvertent actuation by an operator, during operation and when climbing in and out of the utility vehicle.

SUMMARY OF THE INVENTION

The present invention provides a steering wheel console for a utility vehicle which provides a recessed sidewall which provides a mounting surface for control elements. The control elements, being recessed, are substantially protected from being inadvertently actuated or disturbed by an operator.

The invention particularly provides a recessed panel on the steering wheel console for holding heating, ventilating and air conditioning (HVAC) controls for the utility vehicle and a recessed panel for carrying an ignition switch and an air intake for the HVAC system. Furthermore, the steering console provides a volume for housing the air filter and ducting for the heating, ventilating and air conditioning system.

Numerous other advantages and features of the present invention will become readily apparent from the following detailed description of the invention and the embodiments thereof, from the claims and from the accompanying drawings.

BRIEF DESCRIPTION OF THE DRAWINGS

FIG. 2 is an enlarged, fragmentary left-side perspective view of the steering wheel console of FIG. 1;

FIG. 3 is a sectional view taken generally along lines 3—3 of FIG. 2;

FIG. 4 is a sectional view taken generally along lines 4—4 of FIG. 2; and

FIG. 5 is an enlarged fragmentary right-side perspective view of the steering wheel console of FIG. 1.

DETAILED DESCRIPTION OF THE PREFERRED EMBODIMENTS

Figure 1:
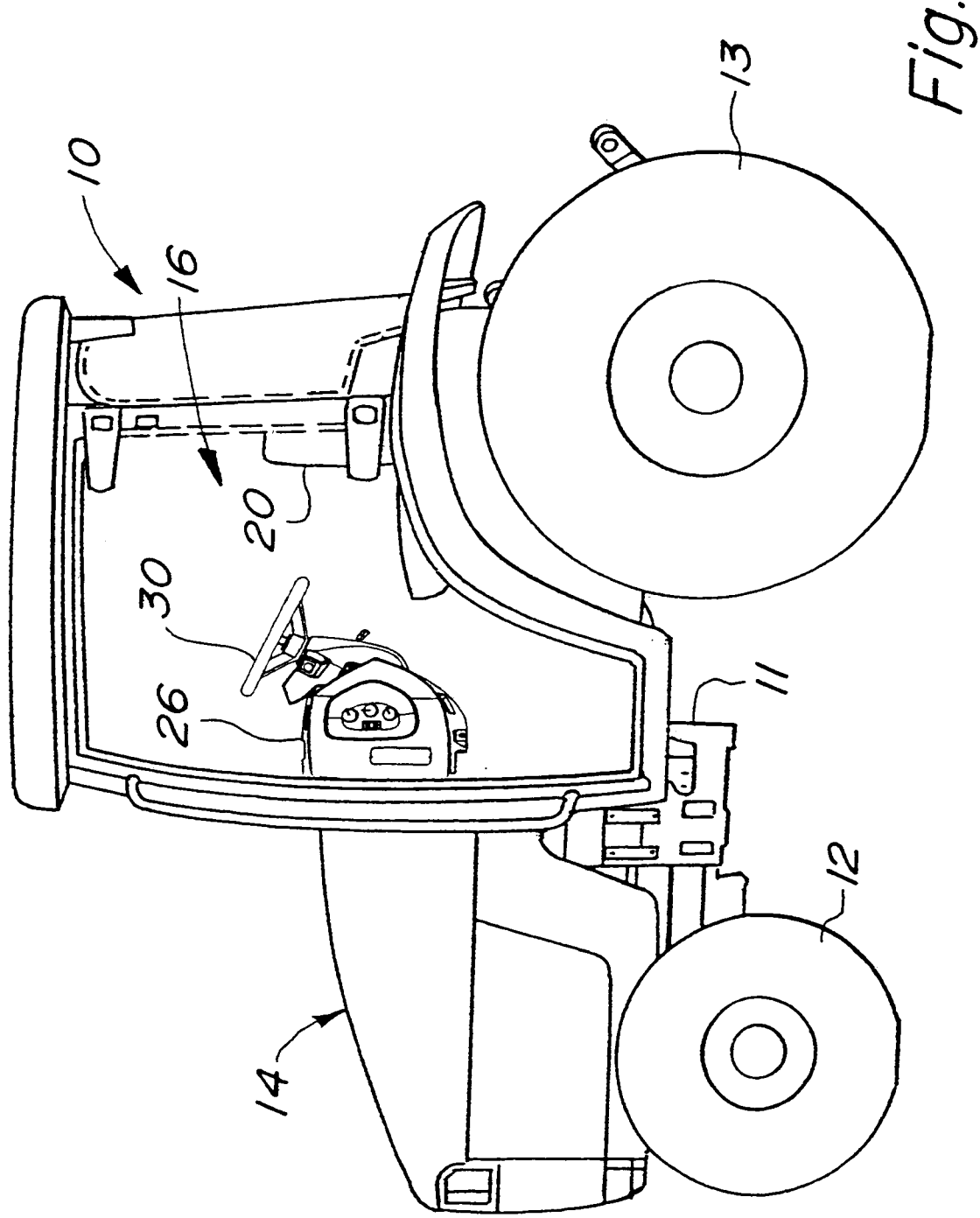
FIG. 1 is an elevational view of a compact tractor incorporating the steering wheel console of the present invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 is a side elevational view of a utility tractor 10 of the present invention. The utility vehicle 10 includes a chassis or frame 11 supported on front wheels 12 and larger rear wheels 13. A hood 14 covers an engine compartment. The utility vehicle 10 includes an operator's station 16 which includes an operator's seat 20 and a steering wheel console 26. A steering wheel 30 protrudes from the steering wheel console 26 to be located in the vicinity of the seat 20, for operating the vehicle 10.

FIG. 2 illustrates the steering wheel console 26 separate from the remaining portions of the utility vehicle 10. The steering wheel console 26 includes a sidewall 34 having a dished or recessed area 36 for holding controls 38, particularly controls for the HVAC system of the utility vehicle. The controls can include a fan speed switch 42 which determines the volume of air blown by the HVAC fan, a temperature control dial 44 which determines the mixture of cold and warm air blown by the fan, and a routing switch 46 which determines the routing or air direction delivered by the HVAC system. An on-off switch 48 is provided to turn on or off the air conditioning compressor of the vehicle.

The recessed area 36 includes a blended gentle sloping frontwall 52 and a steeper rearwall 56. The more gently sloping front wall 52 aids the operator in reaching and manipulating the controls from the operators position on the seat 20. The steeper rear wall 56 provides a location for label placement to describe control functions.

As shown in the sectional view of FIGS. 3 and 4, The recessed area 36 as shown in FIG. 3 is recessed sufficiently that the controls 42, 44, 46, 48 are all beneath the level of the surface 34a of the sidewall 34.

FIG. 5 illustrates the console 26 having an opposite sidewall 70 and a centralized recessed area 72. An ignition switch 76, shown with a key 78, is located within the recessed area 72 fit therein. A grille 79 within the recessed area 72 provides openings 82 for passing air to a filter element 83 (shown in fragmentary fashion) behind the grille 79. The filler element 83 fronts an air inlet duct for the HVAC system. A retaining spider 88 is connected by a bolt 89, which retains the filter 86 behind the grille 79. The console 26 provides a front wall 102 which has an opening 106 for passing a steering shaft 110 of the steering wheel 30. The opening 106 allows for tilting the steering wheel 30.

As illustrated in FIGS. 2 and 5, delivery ducts or vents 62, 92, 112, 114, 120, 121, 122, 123, 124 are provided to direct air into the operator station or cab. The ducts 62, 92, 112, 114, 120, 121, 122, 123, 124 are routed through the console 26 from the air conditioning evaporator and the heating core (both not shown) which are located beneath the hood 14. An air deflector 120a is shown in FIG. 2, overlying the duct 120.

From the foregoing, it will be observed that numerous variations and modifications may be effected without departing from the spirit and scope of the invention. It is to be understood that no limitation with respect to the specific apparatus illustrated herein is intended or should be inferred. It is, of course, intended to cover by the appended claims all such modifications as fall within the scope of the claims.

What is claimed is:

1. In a utility vehicle having an operator's seat facing a steering wheel console, the improvement comprising:

a recessed control panel formed into a first sidewall of said steering console, said panel including controls which extend from said recessed area to a height that is recessed from the sidewall of the steering console.

2. The improvement according to claim 1, wherein said controls comprise switches associated with an air conditioning system of the utility vehicle.

3. The improvement according to claim 2, wherein said sidewall of said steering console comprises vents for distributing air.

4. The improvement according to claim 3, wherein said steering console defines an internal volume housing an air duct, and wherein an air filter associated with said air conditioning system is mounted within said internal volume and arranged to close said duct.

5. The improvement according to claim 4, wherein said steering wheel console comprises a second sidewall opposite said first sidewall, and a recessed area is formed in said second sidewall, said recessed area comprising a grille for allowing air to pass through said second sidewall, said filter arranged behind said grille.

* * * * *